United States Patent
Lemsitzer et al.

(10) Patent No.: US 11,689,571 B2
(45) Date of Patent: Jun. 27, 2023

(54) CERTIFICATE PROVISIONING AND CUSTOMER BINDING MECHANISMS USING DEVICE GROUP IDENTIFICATION TOKEN

(71) Applicant: NXP B.V., Eindhoven (NL)

(72) Inventors: Stefan Lemsitzer, Stainz (AT); Hans de Jong, Eindhoven (NL); Denis Noel, Grez-Doiceau (BE)

(73) Assignee: NXP B.V., Eindhoven (NL)

( * ) Notice: Subject to any disclaimer, the term of this patent is extended or adjusted under 35 U.S.C. 154(b) by 794 days.

(21) Appl. No.: 16/351,062

(22) Filed: Mar. 12, 2019

(65) Prior Publication Data

US 2020/0296135 A1    Sep. 17, 2020

(51) Int. Cl.
- *H04L 9/40* (2022.01)
- *H04L 9/08* (2006.01)
- *H04L 9/32* (2006.01)
- *H04L 41/0806* (2022.01)

(52) U.S. Cl.
CPC ............ *H04L 63/20* (2013.01); *H04L 9/0816* (2013.01); *H04L 9/3213* (2013.01); *H04L 9/3234* (2013.01); *H04L 41/0806* (2013.01)

(58) Field of Classification Search
CPC ..... H04L 63/20; H04L 9/0816; H04L 9/3213; H04L 9/3234; H04L 41/0806; H04L 9/0894; H04L 2209/805; H04L 63/0876; H04L 63/0807; H04L 63/10; H04L 9/0822; H04L 9/0866; G06F 21/44; H04W 4/50; H04W 4/70
USPC ............................................................ 726/5
See application file for complete search history.

(56) References Cited

U.S. PATENT DOCUMENTS

| | | | |
|---|---|---|---|
| 9,479,328 B1 | 10/2016 | Wilburn et al. | |
| 10,447,683 B1* | 10/2019 | Loladia | H04W 12/63 |
| 2013/0080764 A1 | 3/2013 | Khosravi et al. | |
| 2016/0212099 A1 | 7/2016 | Zou et al. | |
| 2017/0026187 A1 | 1/2017 | Ramatchandirane | |
| 2017/0187807 A1 | 6/2017 | Clernon | |
| 2017/0208070 A1 | 7/2017 | Burns et al. | |
| 2018/0041341 A1* | 2/2018 | Gulati | H04L 9/3234 |

* cited by examiner

*Primary Examiner* — Brandon Hoffman

(57) ABSTRACT

A security device provisioning hub, including: a memory; and a processor configured to: receive a first secret token from a device manufacturer, wherein the first secret token is associated with a first service; receive a second secret token from a customer device having a security chip; verify that the first secret token and the second secret token are the same; and provide to the customer device access credentials to the first service.

12 Claims, 2 Drawing Sheets

CERTIFICATE PROVISIONING AND CUSTOMER BINDING MECHANISMS USING DEVICE GROUP IDENTIFICATION TOKEN

TECHNICAL FIELD

Various exemplary embodiments disclosed herein relate generally to certificate provisioning and customer binding mechanisms using device group identification token/secret binder.

BACKGROUND

Internet of things (IoT) cloud platforms and service providers need to trust IoT devices that it provisions and interacts with. In order to enable this trust, devices contain unique key material (according to a public key infrastructure (PKI)) and certificates (e.g. X.509 standard). The certificates and keys are used as device credentials for the authentication to the IoT cloud platforms and service providers. Those credentials need to be specific to the target cloud platforms and to the end customer e.g., end customer A will create 1000 devices and tag them as its own injecting its specific credentials.

Nowadays to inject those credentials, it is necessary to either inject the credentials in the generally untrusted factory of the device manufacturer or earmark the devices at the very beginning of the supply chain meaning that the semiconductor manufacturer is aware of the silicon provider end customer (which may be an original equipment manufacturer (OEM), original device manufacturer (ODM), or simply the device vendor (DV)). The earmarking is done by provisioning customer specific keys and service specific credentials in the silicon.

This earmarking process leads to various requirements. Generally, the earmarking is done in such a way that the semiconductor manufacturer will start to produce a product configuration specific to the customer who ordered it. Then the product will be tailored to the customer requirements, and it may only be sold to this customer. This results in having products predestined to a specific customer.

Such earmarking of a product is only practical for high volume production. The earmarking also limits the flexibility of the product because it needs to be specified pre-production and also includes information for the service, such as a target cloud platform.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a security device provisioning hub, including: a memory; and a processor configured to: receive a first secret token from a device manufacturer, wherein the first secret token is associated with a first service; receive a second secret token from a customer device having a security chip; verify that the first secret token and the second secret token are the same; and provide to the customer device access credentials to the first service.

Various embodiments are described, wherein the processor is further configured to receive an encryption key injected into the security chip by a manufacturer of the security chip.

Various embodiments are described, wherein providing to the customer device access credentials to the first service includes encrypting the access credentials using the encryption key injected into the security chip by a manufacturer of the security chip.

Various embodiments are described, wherein the first secret token and second secret token are encrypted using the encryption key injected into the security chip by a manufacturer of the security chip.

Various embodiments are described, wherein the second secret token is based upon a unique identifier associated with the security chip.

Various embodiments are described, wherein the first secret token and the second secret token are based upon a counter and an account identifier.

Further various embodiments relate to a customer device, including: a secure chip configured to: receive and securely store an encryption key from a manufacturer of the security chip at the time of manufacture; receive and securely store a first secret token from a customer device manufacturer, wherein the first secret token is associated with a first service; provide the first secret token to a security device provisioning hub; and receive and securely store access credentials to the first service; and a processor configured to connect to the first service using the access credentials for the first service.

Various embodiments are described, wherein receiving and securely storing the access credentials includes encrypting the access credentials using the encryption key from a manufacturer of the security chip.

Various embodiments are described, wherein receiving and securely storing the first secret token includes encrypting the first secret token using the encryption key from a manufacturer of the security chip.

Various embodiments are described, wherein the first secret token is based upon a unique identifier associated with the security chip.

Various embodiments are described, wherein the first secret token is based upon a counter and an account identifier.

Various embodiments are described, wherein the secure chip is further configured to: receive and securely store a second secret token from a customer device manufacturer, wherein the second secret token is associated with a second service; provide the second secret token to a security device provisioning hub; and receive and securely store access credentials to the second service; and the processor is further configured to connect to the second service using the access credentials for the second service.

Further various embodiments relate to a method of provisioning customer device using a security device provisioning hub, including: receiving a first secret token from a device manufacturer, wherein the first secret token is associated with a first service; receiving a second secret token from a customer device having a security chip; verifying that the first secret token and the second secret token are the same; providing to the customer device access credentials to the first service.

Various embodiments are described, further including receiving an encryption key injected into the security chip by a manufacturer of the security chip.

Various embodiments are described, wherein providing to the customer device access credentials to the first service includes encrypting the access credentials using the encryption key injected into the security chip by a manufacturer of the security chip.

Various embodiments are described, wherein the first secret token and second secret token are encrypted using the encryption key injected into the security chip by a manufacturer of the security chip.

Various embodiments are described, wherein the second secret token is based upon a unique identifier associated with the security chip.

Various embodiments are described, wherein the first secret token and the second secret token are based upon a counter and an account identifier.

Further various embodiments relate to a method of provisioning customer device, including: receiving and securely storing an encryption key from a manufacturer of the security chip at the time of manufacture; receiving and securely storing a first secret token from a customer device manufacturer, wherein the first secret token is associated with a first service; providing the first secret token to a security device provisioning hub; receiving and securely storing access credentials to the first service; and connecting to the first service using the access credentials for the first service.

Various embodiments are described, wherein receiving and securely storing the access credentials includes encrypting the access credentials using the encryption key from a manufacturer of the security chip.

Various embodiments are described, wherein receiving and securely storing the first secret token includes encrypting the first secret token using the encryption key from a manufacturer of the security chip.

Various embodiments are described, wherein the first secret token is based upon a unique identifier associated with the security chip.

Various embodiments are described, wherein the first secret token is based upon a counter and an account identifier.

Various embodiments are described, further including: receiving and securely storing a second secret token from a customer device manufacturer, wherein the second secret token is associated with a second service; providing the second secret token to a security device provisioning hub; receiving and securely storing access credentials to the second service; and connecting to the second service using the access credentials for the second service.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
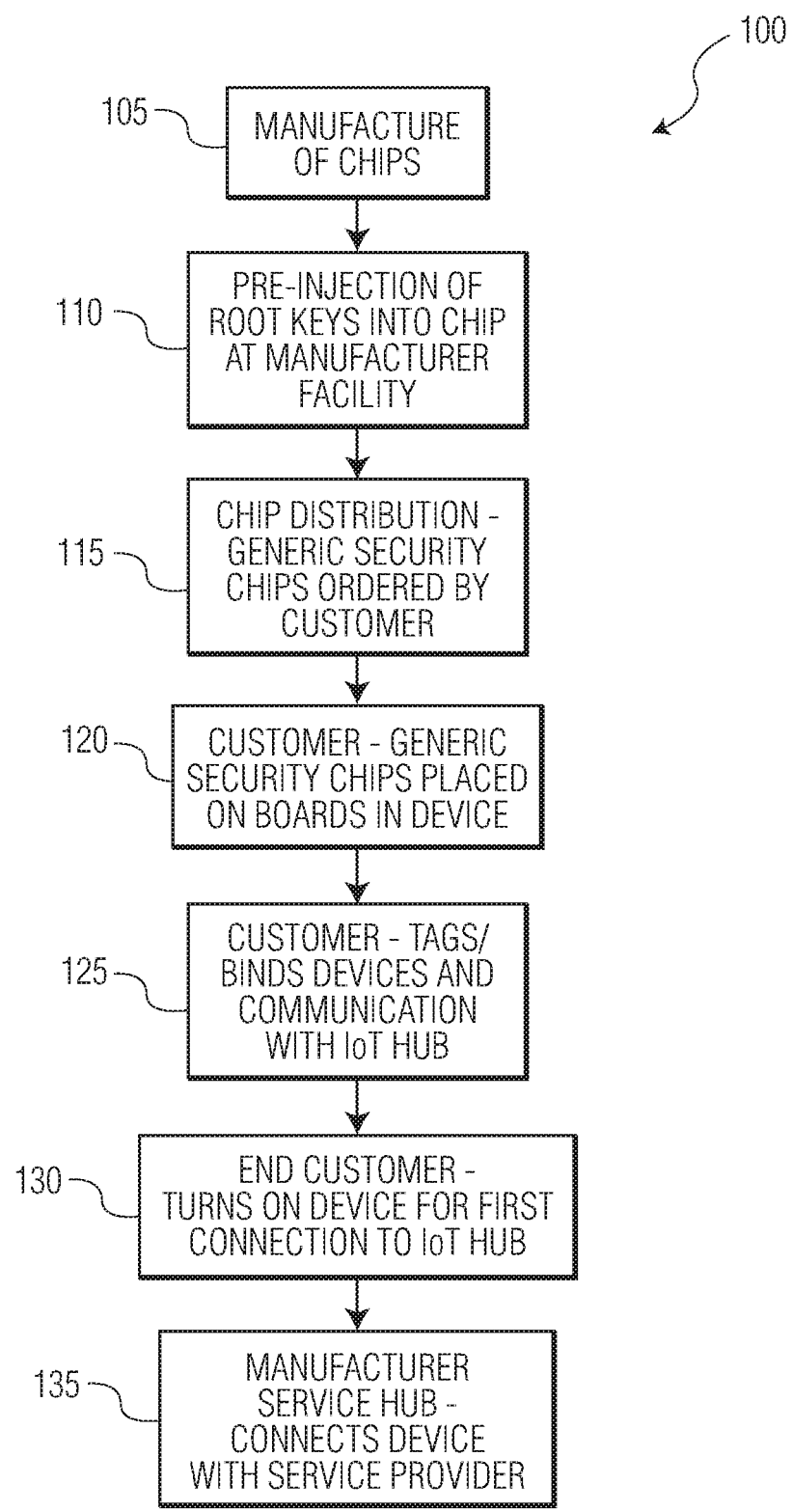
FIG. 1 illustrates overview of the flow of a secure IoT chip from manufacture to deployment.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Embodiments of an IoT hub and associated binding mechanisms are described that aim to make the earmarking unnecessary because the binding to a service is done via the IoT hub using generic chips (meaning that the production is independent of the end customer). While the description herein uses the example of IoT devices, other devices that have security requirements may be used as well.

The embodiments described herein aim to deliver to the end user devices, which may be IoT devices, with embedded hardware that contains unique key material provisioned in a manufacturer's secure premises which enables the devices to connect to the IoT hub, in order to obtain service dependent certificates/credentials to be used in a cloud on-boarding process.

The IoT hub securely deploys IoT devices and integrates them into the different cloud platforms present in the market. The IoT hub is meant as first landing area for the IoT devices, and the IoT hub will prepare those devices for the on-boarding into cloud and service provider platforms.

The IoT hub will authenticate original manufacturer devices (or IoT hub authorized devices) and provide them with the credentials to access the target service provider.

The manufacturer is agnostic of the end-customer, of the device use cases, and of the target service providers. This means that the IoT hub will earmark the devices once devices are already in the field (while nowadays devices are customized at the very beginning of the silicon production at the manufacturer premises, or by the device manufacturer who in that case needs a secure production environment). The IoT hub will allow the distribution of silicon devices via distributors and will allow for low volume customer orders (because previously low volume orders could not justify the cost of unique secure silicon).

The IoT hub has the following various key features. The IoT hub serves as a central point to assign generic devices to customers and service providers. The IoT hub facilitates the binding of devices to end customer via injection of customer specific profile secret (device group identification token).

FIG. 1 illustrates overview of the flow of a secure IoT chip from manufacture to deployment. The flow 100 starts with the manufacturer producing generic (i.e., customer agnostic) chips 105. Then an individual and unique keypair is injected 110 into each chip. Next, a customer orders generic chips to be used in its devices 115. The customer may order chips either via distributor or direct from the manufacturer. In this step there is no limit (minimum or maximum) on the order volume. Next, during appliance manufacturing, the chips are put into a board and embedded in the devices 120. Then the customer will tag/bind the devices and communicate this binding to the IoT hub to establish this binding in the IoT hub 125. It is noted that there could also be an intermediate step where a printed circuit board (PCB) manufacturer receives chips from the chip manufacturer and manufactures PCBs with the chip. The PCB boards are then used by a device manufacturer or OEM to produce the device. An end customer may receive the device through various device distribution channels. Then the end customer receives the device and turns it on for a first connection to the IoT hub 130. The IoT Hub will authenticate the device using the original manufacturer key material injected at step 110. According to the binding/tagging performed in step 125, the IoT hub will provide the customer device with the credentials needed to access a target service provider based on the tag as defined by the customer. Because of this process, the customer devices are now able to connect to the target service platform using a generic chip.

Figure 2:
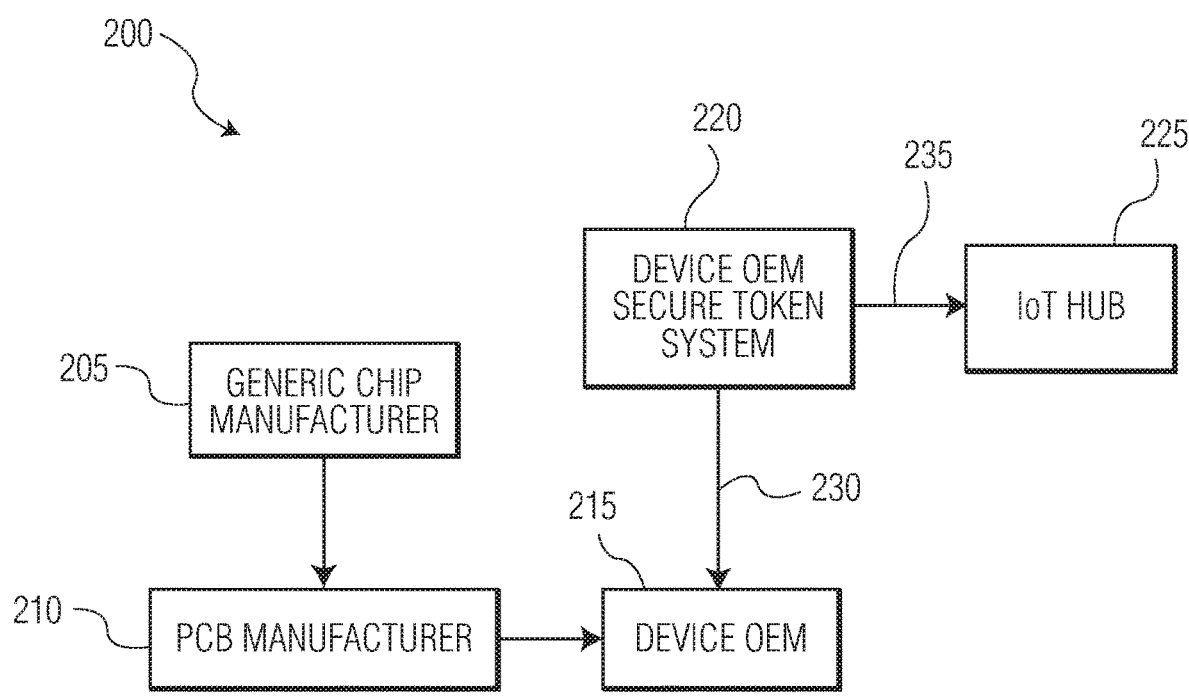
FIG. 2 illustrates a diagram of a system for binding of devices to an end customer/OEM/device vender via injection of a customer specific secret.

FIG. 2 illustrates a diagram of a system for binding of devices to an end customer/OEM/device vender via injection of a customer specific secret. As described above, the generic chip manufacturer 205 will distribute chips to a PCB manufacturer 210 who manufactures PCBs with the generic chips. The device OEM 215 may receive PCBs from the PCB manufacturer 210 that include the generic chip. In alternative embodiments, the device OEM 215 may receive generic chips directly from the generic chip manufacturer 205. A device OEM secure token system 220 generates a secure token. The secure token may also be thought of as secure binder as well that securely binds any device with the token to a specific device OEM. The device OEM secure token system securely injects the secure token into the device 230. The device OEM 215 may then sell or distribute its devices to end customers/users. The device OEM secure token system 220 also securely sends secure token 235 to the IoT hub 225, so that the IoT hub 215 will then be able to interact with the device once it is in the possession of the end user and provide secure access to a service provider.

In order to tag the generic chips in the OEM devices, the OEM uses a secret token known and defined as device group identification token. This secret token will be used to earmark at the very end of the supply chain the generic manufacturer chips and associate them to the customer who generated the secret token. This secret token will be used to cluster some devices into a group because it is assumed that devices with a specific secret token belong to the secret token issuer (i.e., the OEM. This step does not include any handling of key material on behalf of the customer.

There are two options of deployment for the secret token. First, the device OEM may embed the token in the firmware of the OEM devices. In this case, the device OEM needs to trust that the contract manufacturer does not re-use or communicate to untrusted third party the secret token to make sure that they will not be used in counterfeited or overproduced devices.

Second, an enhanced security secret token may be used. The manufacturer provides the device OEM with capabilities to encrypt the secret token using the root keys pre-injected by the chip manufacturer so that the encrypted secret token may be directly downloaded into a secure element of the generic chip to securely store the secret token. This prevents malicious attackers from reading the secret token from the firmware and re-using the secret token in counterfeited/clone devices. Only devices having chips provided by the original chip manufacturer will be able to be tagged.

In both cases, when the OEM devices connect to the IoT hub 225 they will be associated to the right device OEM 215 owner, and the OEM devices will be provided with the credentials to access the services allowed by the device OEM. The secret token will be used as a means to verify that the customer device is associated with an OEM. Only customer devices with a secret token which matches the secret token stored into the IoT hub 225 that is provided by the device OEM will be authenticated and provisioned with the credentials to access the target service. The IoT hub 225 may receive specific service credentials from the device OEM 215, or the IoT hub 225 may receive an indication of the services associated with a secret token and then arrange for credentials for those services from the service providers.

Now an example of how the secret token is created and can be used to unlock and bind devices to the OEM will be described. All generic chips associated with a certain product configuration are locked with a master key. This key may be indicated as K_MASTER. An OEM creates an account within IoT hub 225. This step will create an account ID in the IoT hub 225. This ID will be used to create an unlock key for the devices associated with the OEM.

An unlock key may be defined as follows: MAC(Derive (K_MASTER, Counter, accountID), Counter<8B>|accountID<8B>), where MAC is a function for producing a message authentication code, Derive is a function that produces an output based upon the three inputs, Counter is an 8 byte counter, and accountID is an 8 byte account ID associated with the device OEM. For example, the account ID may be associated with a specific service or set of services. One device OEM could then have different accountIDs associated with various different services or sets of services. Other ways may be used to define the unlock key as well. There are two options for unlock keys: a unique key for all OEM devices; or diversified unlock keys per device: in this case the chip may derive a key using the unique identifier (UID) associated with the chip.

This unlock key corresponds to the secret token. The unlock key may be computed in the IoT hub using the counter and the account ID. The OEM devices will compute the matching keys using the same data that the OEM injects in the OEM devices during OEM device manufacturing This unlock key plays the role of the tagging the OEM device with the secret token directly in the field.

The embodiments described herein provide a technological advantage of allowing for the manufacture of generic security chips that may later be bound to a device manufactured by a device OEM. Such binding will allow the end user of the OEM device to securely gain access to services specified by the OEM. As a result, such secret tokens do not need to be injected by the chip manufacturer, thus allowing for a single security chip to be widely used by a variety of device OEMs. This allows for even small numbers of generic secure chips to be securely provisioned by a device OEMs.

The embodiments described herein may be implemented as software running on a processor with an associated memory and storage. The processor may be any hardware device capable of executing instructions stored in memory or storage or otherwise processing data. As such, the processor may include a microprocessor, field programmable gate array (FPGA), application-specific integrated circuit (ASIC), graphics processing units (GPU), specialized neural network processors, cloud computing systems, or other similar devices.

The memory may include various memories such as, for example L1, L2, or L3 cache or system memory. As such, the memory may include static random-access memory (SRAM), dynamic RAM (DRAM), flash memory, read only memory (ROM), or other similar memory devices.

The storage may include one or more machine-readable storage media such as read-only memory (ROM), random-access memory (RAM), magnetic disk storage media, optical storage media, flash-memory devices, or similar storage media. In various embodiments, the storage may store instructions for execution by the processor or data upon with the processor may operate. This software may implement the various embodiments described above.

Further such embodiments may be implemented on multiprocessor computer systems, distributed computer systems, and cloud computing systems. For example, the embodiments may be implemented as software on a server, a specific computer, on a cloud computing, or other computing platform.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A security device provisioning hub, comprising:
a memory; and
a processor configured to:
receive a first secret token from a device manufacturer, wherein the first secret token is associated with a first service;
receive a second secret token from a customer device having a security chip;
verify that the first secret token and the second secret token are identical;
after verification that the first secret token and the second secret token are identical, establish binding of the customer device in the security device provisioning hub; and
provide, to the customer device, access credentials to the first service.

2. The security device provisioning hub of claim 1, wherein the processor is further configured to:
receive an encryption key injected into the security chip by a manufacturer of the security chip.

3. The security device provisioning hub of claim 2, wherein providing, to the customer device, access credentials to the first service includes:
encrypting the access credentials using the encryption key injected into the security chip by the manufacturer of the security chip.

4. The security device provisioning hub of claim 2, wherein the first secret token and second secret token are encrypted using the encryption key injected into the security chip by the manufacturer of the security chip.

5. The security device provisioning hub of claim 1, wherein the second secret token is based upon a unique identifier associated with the security chip.

6. The security device provisioning hub of claim 1, wherein the first secret token and the second secret token are based upon a counter and an account identifier.

7. A method of provisioning customer device using a security device provisioning hub, comprising:
receiving a first secret token from a device manufacturer, wherein the first secret token is associated with a first service;
receiving a second secret token from a customer device having a security chip;
verifying that the first secret token and the second secret token are identical;
after verification that the first secret token and the second secret token are identical, establish binding of the customer device in the security device provisioning hub; and
providing, to the customer device, access credentials to the first service.

8. The method of claim 7, further comprising:
receiving an encryption key injected into the security chip by a manufacturer of the security chip.

9. The method of claim 8, wherein providing to the customer device access credentials to the first service includes:
encrypting the access credentials using the encryption key injected into the security chip by the manufacturer of the security chip.

10. The method of claim 8, wherein the first secret token and second secret token are encrypted using the encryption key injected into the security chip by the manufacturer of the security chip.

11. The method of claim 7, wherein the second secret token is based upon a unique identifier associated with the security chip.

12. The method of claim 7, wherein the first secret token and the second secret token are based upon a counter and an account identifier.

* * * * *